US011976793B1

(12) United States Patent
Jiang

(10) Patent No.: US 11,976,793 B1
(45) Date of Patent: May 7, 2024

(54) PORTABLE ROTATING LAMP

(71) Applicant: Yong Jiang, Guangzhou (CN)

(72) Inventor: Yong Jiang, Guangzhou (CN)

( * ) Notice: Subject to any disclaimer, the term of this patent is extended or adjusted under 35 U.S.C. 154(b) by 0 days.

(21) Appl. No.: 18/134,499

(22) Filed: Apr. 13, 2023

(51) Int. Cl.
*F21L 4/04* (2006.01)
*F21V 21/096* (2006.01)
*F21V 21/30* (2006.01)
*F21V 21/32* (2006.01)
*F21V 29/89* (2015.01)

(52) U.S. Cl.
CPC ............ *F21L 4/04* (2013.01); *F21V 21/0965* (2013.01); *F21V 21/30* (2013.01); *F21V 21/32* (2013.01); *F21V 29/89* (2015.01)

(58) Field of Classification Search
CPC ...... F21V 17/18; F21V 21/32; F21V 21/0965; F21V 21/145; F21V 21/30; F21V 21/26; F21V 21/28; F21V 21/29; F21V 21/116; F21V 21/06; F21V 21/406; F21V 14/025; F21L 4/04; F21L 4/045; F21L 4/02; F21L 15/08
See application file for complete search history.

(56) References Cited

U.S. PATENT DOCUMENTS 4,965,708 A * 10/1990 Louis .................. F21V 21/0965
5,142,467 A * 8/1992 Yuen ....................... F21V 21/06
5,684,452 A * 11/1997 Wang ........................ F21L 4/04
5,931,560 A * 8/1999 Hoffman ............... F21V 21/145 362/208
5,993,022 A * 11/1999 Neyer ................. F21V 23/0414
6,206,542 B1 * 3/2001 Case ................... F21V 21/0925
7,938,570 B2 * 5/2011 Lee ....................... F21V 21/116 362/652
10,267,501 B1 * 4/2019 Lowchareonkul ...... F21V 23/04
2002/0167806 A1 * 11/2002 Thaxton ................. F16M 11/40
2003/0086268 A1 * 5/2003 Kovacik ............... F21L 14/026 362/427
2003/0141420 A1 * 7/2003 Knight ................... F16M 11/18 248/128
2005/0007777 A1 * 1/2005 Klipstein ................ F21L 4/027 362/244
2005/0030745 A1 * 2/2005 Chen ........................ B60Q 7/00 362/249.02
2006/0082990 A1 * 4/2006 Hsu ......................... F21L 4/045 362/157

(Continued)

*Primary Examiner* — Peggy A Neils
*Assistant Examiner* — James M Endo
(74) *Attorney, Agent, or Firm* — Che-Yang Chen; Law Office of Michael Chen

(57) ABSTRACT

A portable rotating lamp includes a bottom support seat, a bottom magnetic attraction block, a disk shell, a front side shell, a rear side shell and a connecting arc frame, wherein the top end of the bottom support seat is clamped with the clamping disk body, the top surface of the clamping disk body is plugged with the rotating lamp body, the top surface of the bottom magnetic attraction block is fixedly connected with the socket shell, and the top surface of the socket shell is fixedly connected with the clamping rotary block. The lamp boards are used when in lighting, which are not easy to burn, and the lamp boards could be replaced more conveniently. Moreover, the whole bottom support seat is provided with magnetic attraction, which could be placed easier and used more conveniently.

6 Claims, 8 Drawing Sheets

(56) References Cited

U.S. PATENT DOCUMENTS

| | | | | |
|---|---|---|---|---|
| 2006/0158884 | A1* | 7/2006 | Kim | F21V 21/406 362/269 |
| 2008/0232097 | A1* | 9/2008 | Gandhi | F21V 21/32 362/191 |
| 2008/0304257 | A1* | 12/2008 | Opolka | F21V 21/092 362/194 |
| 2010/0277899 | A1* | 11/2010 | Peak | B60Q 7/00 362/183 |
| 2011/0228524 | A1* | 9/2011 | Greer | F21L 4/00 362/190 |
| 2013/0148351 | A1* | 6/2013 | Georgitsis | B60Q 1/24 362/249.02 |
| 2013/0265755 | A1* | 10/2013 | Adams | F21S 41/29 362/235 |
| 2014/0153267 | A1* | 6/2014 | Georgitsis | F21V 29/763 362/430 |
| 2015/0102189 | A1* | 4/2015 | Klamm | F16M 11/40 248/176.3 |
| 2015/0345765 | A1* | 12/2015 | Horst | F21V 31/005 362/362 |
| 2016/0209013 | A1* | 7/2016 | Chien | F21V 14/02 |
| 2016/0320026 | A1* | 11/2016 | Duckworth | F21V 31/005 |
| 2017/0108197 | A1* | 4/2017 | Cacciabeve | F21V 15/01 |
| 2017/0276304 | A1* | 9/2017 | Domingo | F21V 21/08 |
| 2017/0336056 | A1* | 11/2017 | Fan | F21V 21/145 |
| 2019/0107263 | A1* | 4/2019 | Adams | F21V 11/16 |
| 2020/0191365 | A1* | 6/2020 | Hashimoto | F21V 17/16 |
| 2022/0090768 | A1* | 3/2022 | Westling | F21L 2/00 |
| 2022/0266644 | A1* | 8/2022 | Oishi | F21V 31/005 |
| 2023/0084530 | A1 | 3/2023 | Wagner et al. | |

* cited by examiner

PORTABLE ROTATING LAMP

FIELD OF THE INVENTION

The invention relates to the field of heat dissipation lamps, in particular to a portable rotating lamp.

BACKGROUND OF THE INVENTION

Lighting supplies, which are generally refer to appliances for illuminating. The ancients used torches for lighting in ancient times, and later candles, oil lamps and electric lamps were gradually invented. Lamps are a general term for lighting tools, including chandeliers, table lamps, wall lamps, floor lamps, etc, which are generally refer to the appliances that can transmit light, distribute light, and change the distribution of light from a light source, including all components necessary for fixing and protecting the light source, except for the light source, as well as wiring accessories necessary for connecting to the power supply. European classical style chandeliers are inspired by the candlestick lighting method of ancient people, when people placed several candles on suspended iron art. Nowadays, many chandeliers are designed in this style, but the candles have been changed into light bulbs, the bulbs and holders still look like candles and candlesticks.

When the traditional lamps are used, the overall rotation effect is relatively poor, and they cannot rotate at multiple angles with single overall rotation mode. Meanwhile, the overall heat dissipation effect is relatively poor only with heat dissipation metal sheets and the heat dissipation design. Moreover, the whole lamp board is easy to burn when in lighting, and the replacement of the lamp board is relatively complicated; finally, the whole bottom support seat has no magnetic attraction, so it cannot be placed easily and is not convenient to use. Therefore, a portable rotating lamp is needed to solve the problems mentioned in the background.

SUMMARY OF THE INVENTION

The purpose of the invention is to provide a portable rotating lamp, which aims to solve the problems mentioned in the above background, that is, when the traditional lamps are used, the overall rotation effect is relatively poor. Meanwhile, the overall heat dissipation effect is relatively poor by merely the heat dissipation metal sheets and the heat dissipation design. Moreover, the whole lamp board is easy to burn when in lighting, and the replacement of the lamp board is relatively complicated; finally, the whole bottom support seat has no magnetic attraction, so it cannot be placed easily and is not convenient to use.

In one aspect in the present invention, a portable rotating lamp includes the bottom support seat, the bottom magnetic attraction block, the disk shell, the front side shell, the rear side shell and the connecting arc frame. The top end of the bottom support seat is clamped with the clamping disk body, and the top surface of the clamping disk body is plugged with the rotating lamp body; the top surface of the bottom magnetic attraction block is fixedly connected with the socket shell, and the top surface of the socket shell is fixedly connected with the clamping rotary block, the outer wall of the socket shell is provided with anti-skid patterns of shell, the flexible supporting rod is arranged within the clamping rotary block; the outer wall of the bottom surface of the disk shell is provided with the clamping groove, the top surface of the disk shell is provided with the plug-in rotary through hole and the matching block; The front side shell and the rear side shell are rotatably connected within the connecting arc frame, screw holes are positioned on the top surfaces of the front side shell and the rear side shell, polymer battery is placed within the front side shell and the rear side shell, the outer walls on both sides of the connecting arc frame are respectively provided with heat dissipation metal piece A and heat dissipation metal piece B, the top surface of the rear side shell is provided with the circuit board controlled by switch; the fixed lamp plate is fixedly connected inside the front side shell, the lamp board is embedded inside the fixed connecting plate, the bottom of the connecting arc frame is provided with the inserted rotating block, and the bottom of the inserted rotating block is inserted into the plug-in rotary through hole.

As a preferred embodiment of the invention, the rotation angle range between the clamping disk body and the rotating lamp body is 0-360°, the rotation angle range among the front side shell, the rear side shell and the connecting arc frame is 0-360°.

As a preferred embodiment of the invention, the bottom support seat comprises the bottom magnetic attraction block, the socket shell, the anti-skid pattern of shell, the clamping rotary block and the flexible support rod, one end of the flexible support rod is fixedly connected with the clamping rotary block, and the other end of which is fixedly connected with the bottom magnetic attraction block.

As a preferred embodiment of the invention, the clamping disk body includes the disk shell, the clamping groove, the plug-in rotary through hole and the matching block, and the top end of the clamping rotary block is clamped with the clamping groove.

As a preferred embodiment of the invention, the heat dissipation metal piece A and the heat dissipation metal piece B are located at the joint between the connecting arc frame with the front side shell and the rear side shell respectively, and the front side shell and the rear side shell are oppositely arranged.

As a preferred embodiment of the invention, the rotating lamp body includes the front side shell, the rear side shell, the connecting arc frame, the heat dissipation metal piece A, the heat dissipation metal piece B, the lamp board, the fixed connecting plate, the inserted rotating block, the circuit board controlled by switch, the screw hole and the polymer battery, and the polymer battery is electrically connected with the circuit board controlled by switch and the lamp board through wires.

As a preferred embodiment of the invention, the sealant is provided within the screw hole, the joint between the front side shell and the rear side shell, the joint of the heat dissipation metal piece A and the heat dissipation metal piece B with the connecting arc frame.

Compared with the prior art, the present invention is advantageous because the portable rotating lamp of this invention could overcome that shortcomings that the overall rotating effect of the traditional lamp is relatively poor when in use, in this invention, the overall rotating mode is diversified and could be rotated through two kinds of 360° angles, so that the overall rotating range is wider and multi-angle rotation could be carried out. At the same time, the overall heat dissipation effect could be better when in use, and heat dissipation is achieved through the heat dissipation metal sheet, so that the heat dissipation setting is more ingenious. Moreover, the lamp boards are used when lighting, which are not easy to burn, and the lamp boards could be replaced more conveniently. Finally, the whole bottom support seat is provided with magnetic attraction, which could be placed easier and used more conveniently.

BRIEF DESCRIPTION OF THE DRAWINGS

Other features, objects and advantages of the present invention will become more apparent through the detailed description of the non-limiting embodiments with reference to the following drawings.

DETAILED DESCRIPTION OF THE PREFERRED EMBODIMENTS

Figure 1:
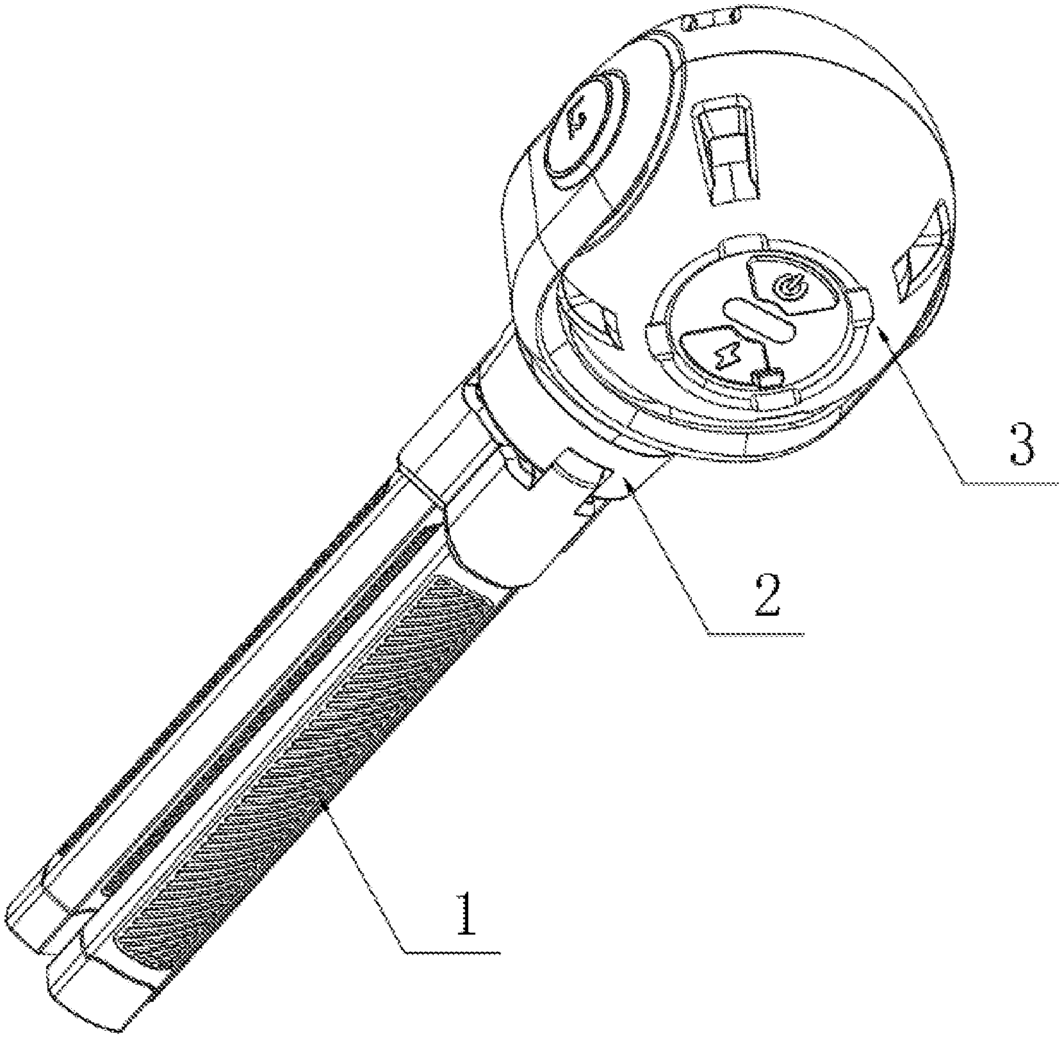
FIG. 1 is the perspective view of the portable rotating lamp.
Figure 2:
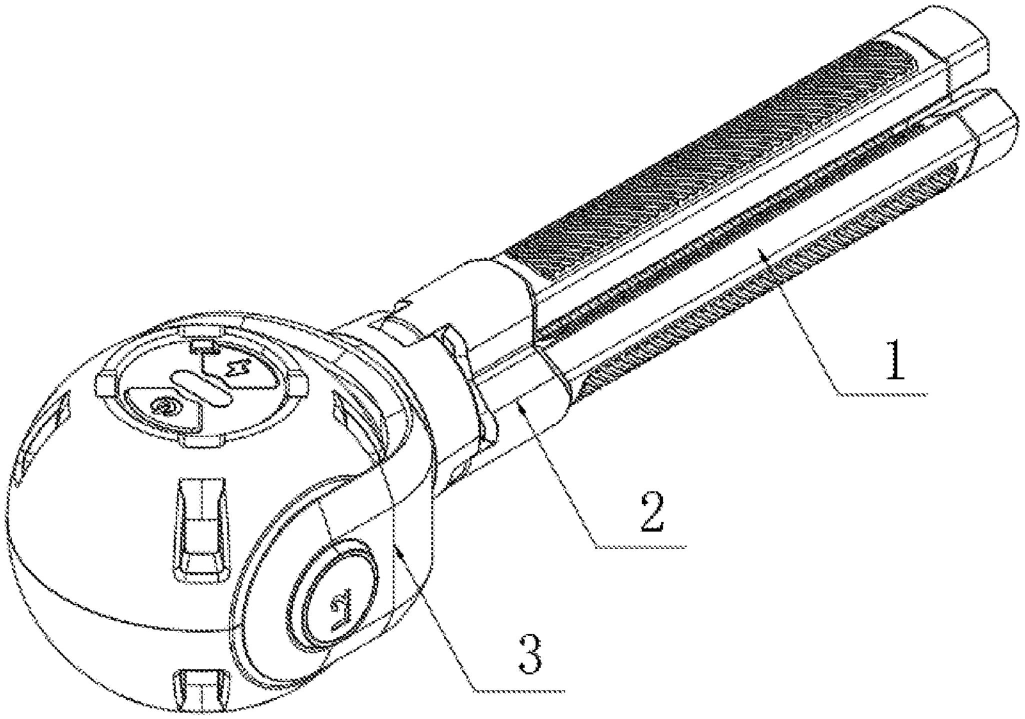
FIG. 2 is isometric schematic side view of the portable rotating lamp.
Figure 3:
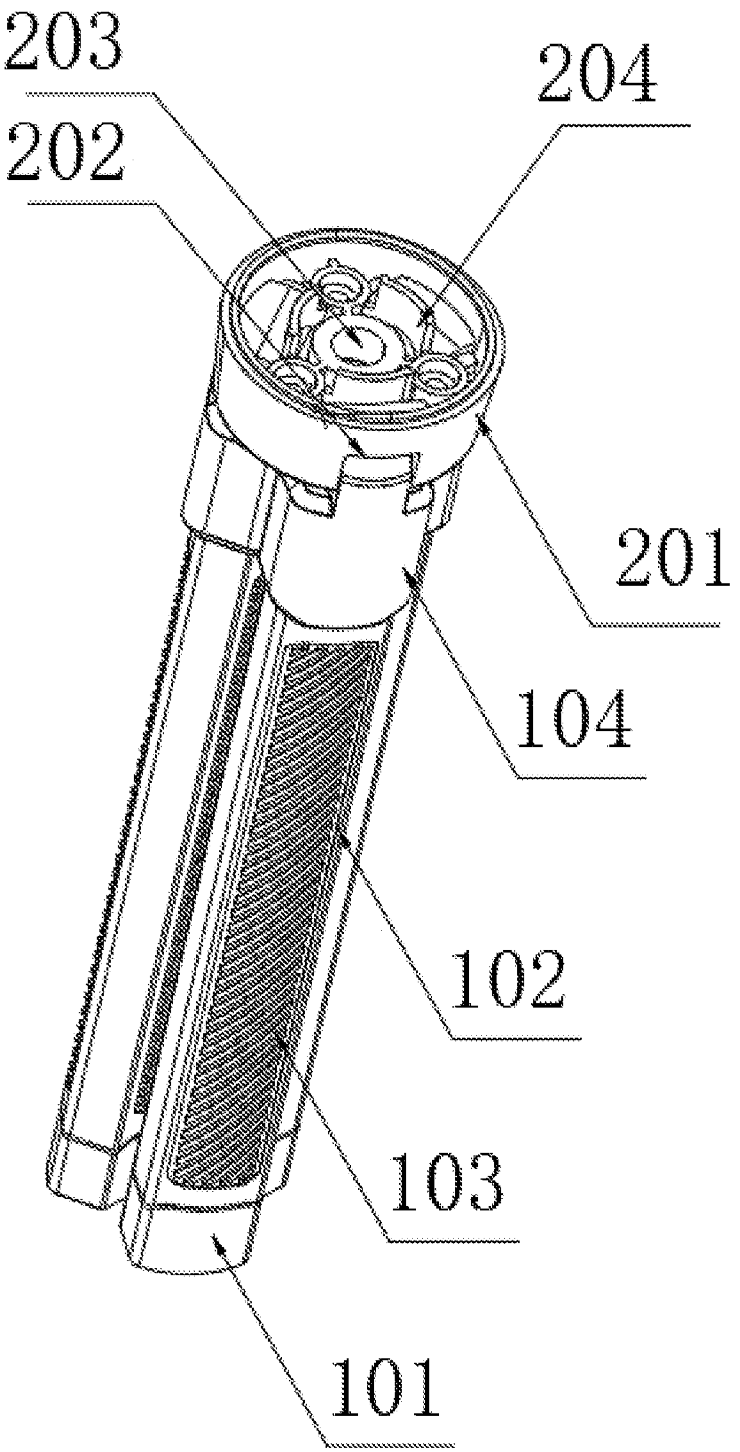
FIG. 3 is the perspective view of the bottom support seat and the clamping disk body under the connected state.
Figure 4:
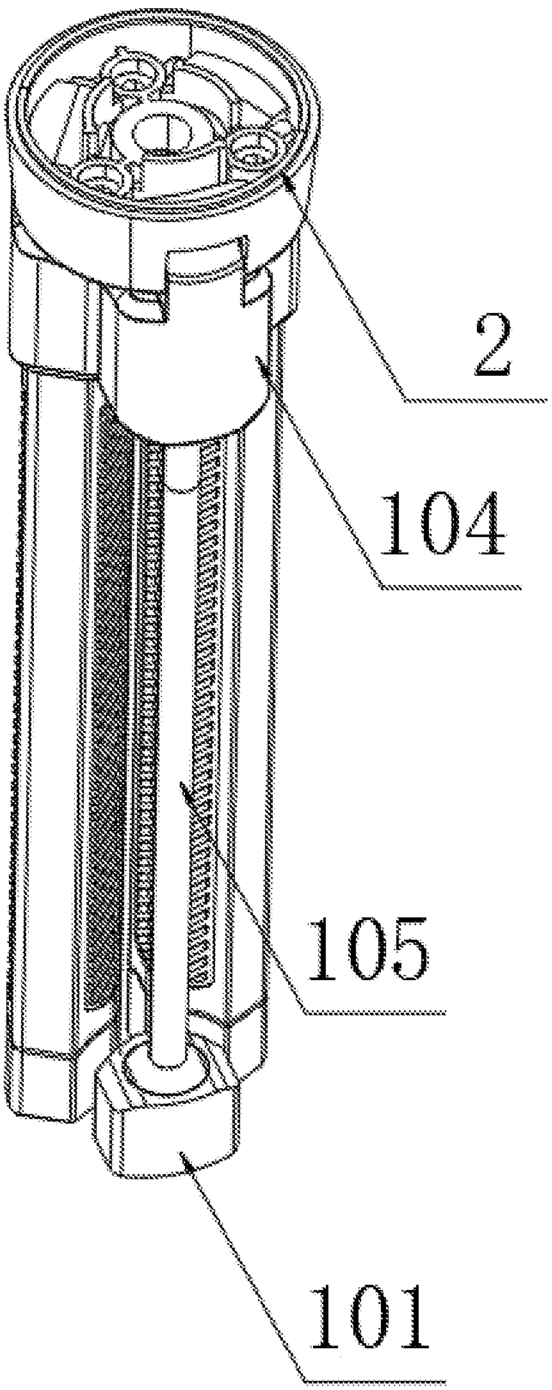
FIG. 4 is the internal schematic view of the bottom support seat when connected with the clamping disk body.
Figure 5:
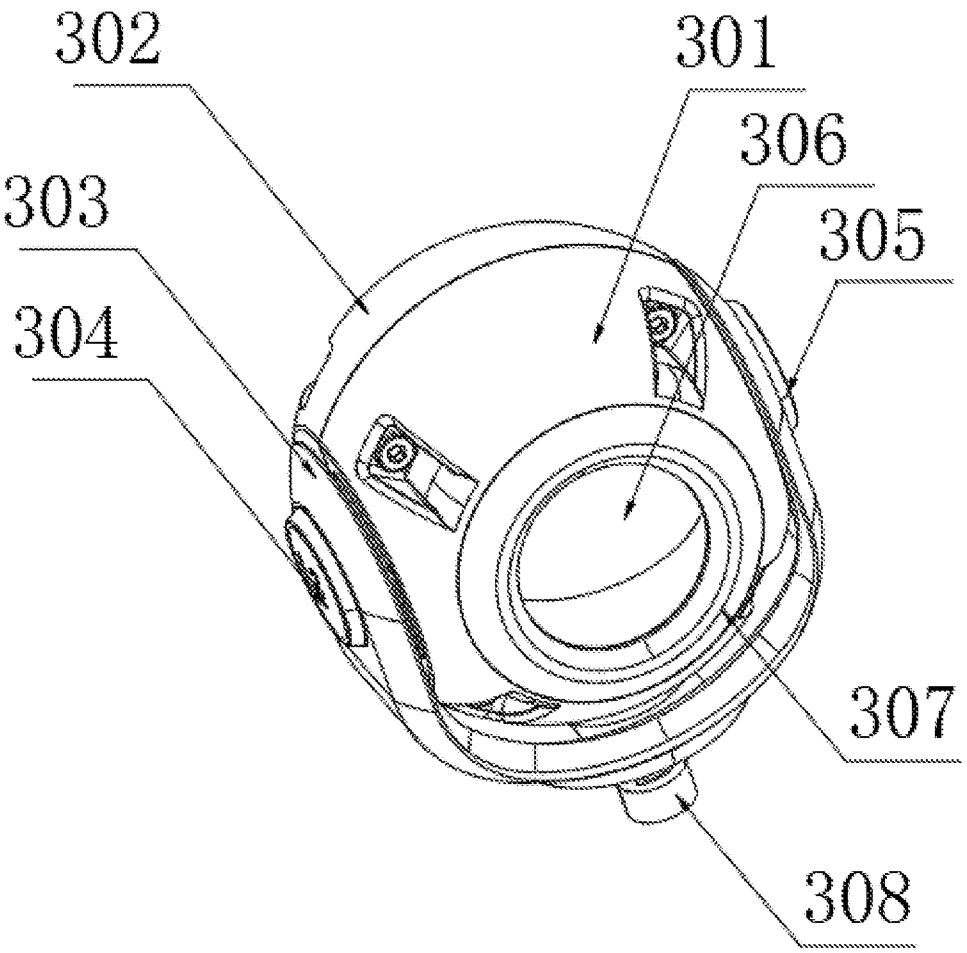
FIG. 5 is the perspective view of the rotating lamp body.
Figure 6:
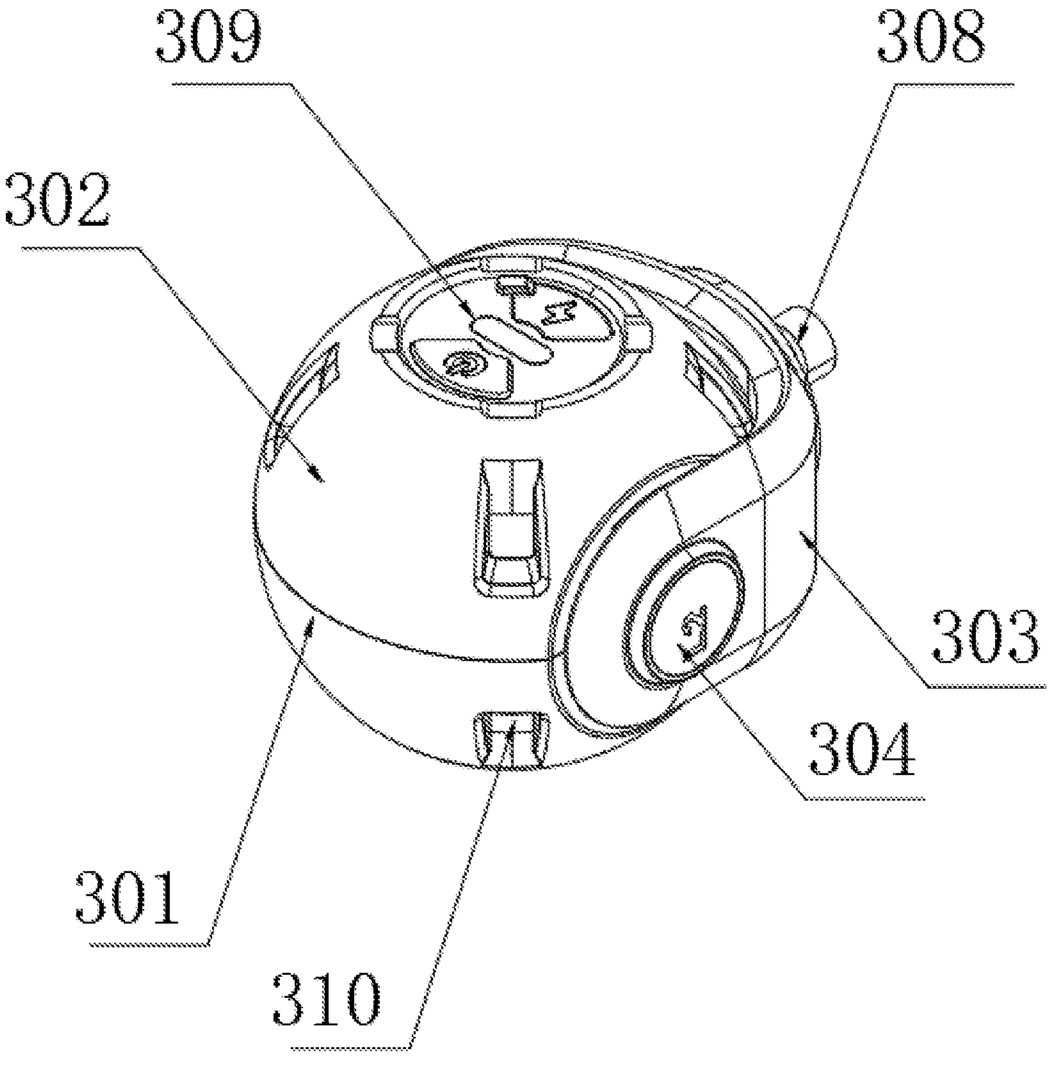
FIG. 6 is the isometric schematic side view of the rotating lamp body.
Figure 7:
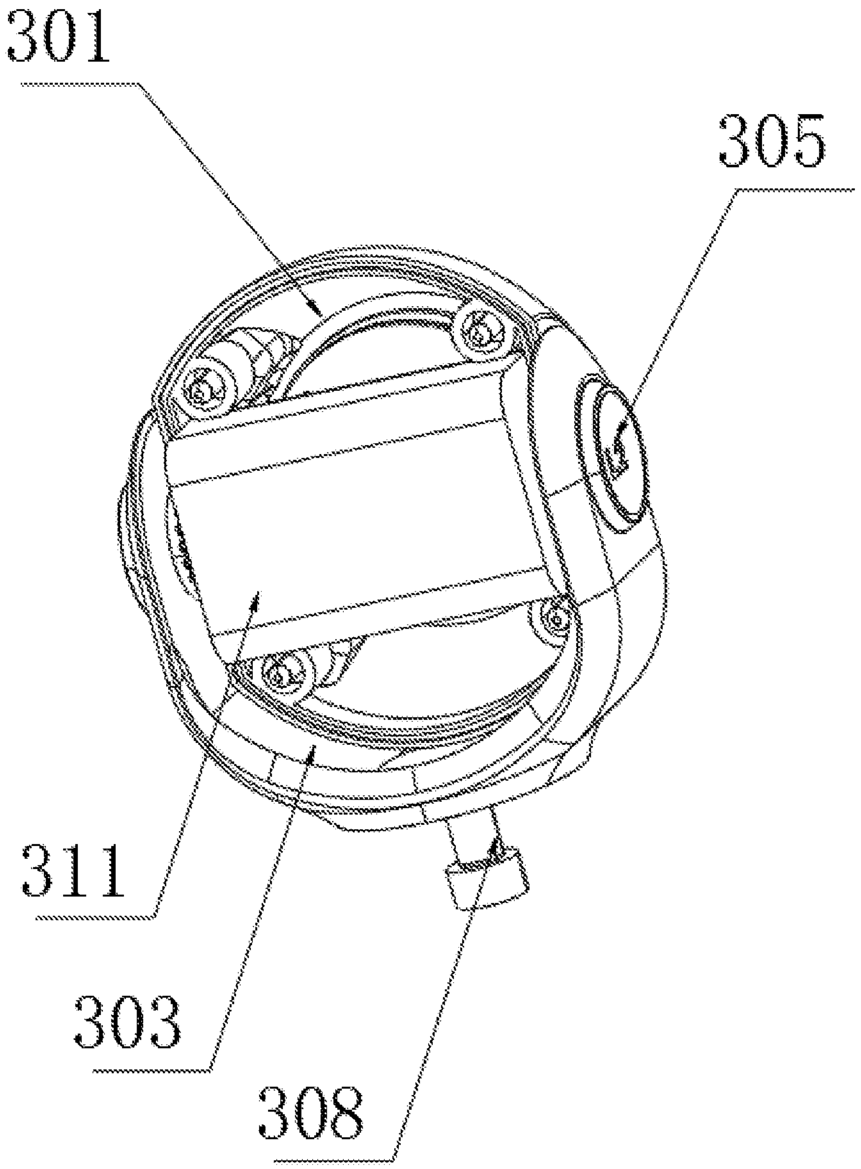
FIG. 7 is the internal schematic view of the rotating lamp body.
Figure 8:
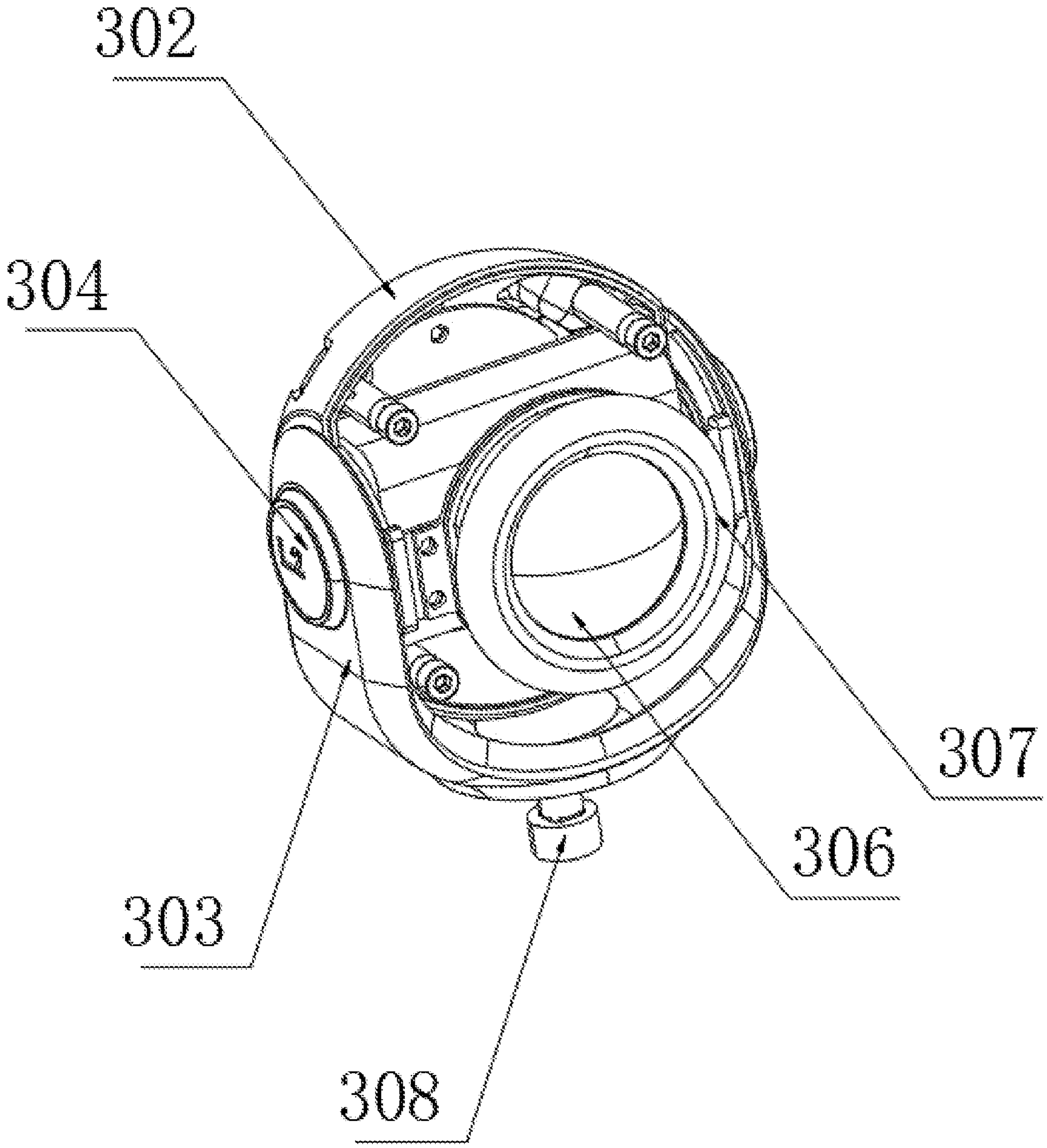
FIG. 8 is the isometric side view of the internal structure of rotating lamp body.

Referring to FIGS. 1-8, in the embodiment of the present invention, a portable rotating lamp includes the bottom support seat 1, the bottom magnetic attraction block 101, the disk shell 201, the front side shell 301, the rear side shell 302 and the connecting arc frame 303. The top end of the bottom support seat 1 is clamped with the clamping disk body 2, and the top surface of the clamping disk body 2 is plugged with the rotating lamp body 3, which could overcome the shortcomings that the overall rotation effect of the traditional lamp is relatively poor when in use, in this invention, the whole rotating mode is diversified and could be rotated through two types of 360° angles, so that the whole rotating range is wider and could be rotated at multiple angles. The top surface of the bottom magnetic attraction block 101 is fixedly connected with the socket shell 102, and the top surface of the socket shell 102 is fixedly connected with the clamping rotary block 104, the outer wall of the socket shell 102 is provided with anti-skid patterns of shell 103, the flexible supporting rod 105 is arranged within the clamping rotary block 104; the outer wall of the bottom surface of the disk shell 201 is provided with the clamping groove 202, the top surface of the disk shell 201 is provided with the plug-in rotary through hole 203 and the matching block 204; When in use, the disk shell 201 could play the role of connecting the bottom support seat 1 and the rotating lamp body 3, the installing and dismounting of the clamping rotary block 104 could be realized through the clamping groove 202, the flexible support rod 105 could achieved the flexible function. The front side shell 301 and the rear side shell 302 are rotatably connected within the connecting arc frame 303, screw holes 310 are positioned on the top surfaces of the front side shell 301 and the rear side shell 302, polymer battery 311 is placed within the front side shell 301 and the rear side shell 302, the outer walls on both sides of the connecting arc frame 303 are respectively provided with heat dissipation metal piece A 304 and heat dissipation metal piece B 305, the top surface of the rear side shell 302 is provided with the circuit board controlled by switch 309; the magnetic attraction effect could be achieved through the bottom magnetic attraction block 101, the anti-skid pattern of shell 103 could effectively play the role of anti-skid, the plug-in rotary through hole 203 and the matching block 204 can facilitate the insertion and clamping of the inserted rotating block 308, the polymer battery 311 could supply power to the circuit board controlled by switch 309 and the lamp board 306, the heat dissipation metal piece A 304 and the heat dissipation metal piece B 305 could achieved the function of heat dissipation, the connecting arc frame 303 is used for connecting; the fixed lamp plate 307 is fixedly connected inside the front side shell 301, the lamp board 306 is embedded inside the fixed connecting plate 307, the bottom of the connecting arc frame 303 is provided with the inserted rotating block 308, and the bottom of the inserted rotating block 308 is inserted into the plug-in rotary through hole 203.

Referring to FIG. 1, FIG. 3, FIG. 5 and FIG. 8, the rotation angle range between the clamping disk body 2 and the rotating lamp body 3 is 0-360 degree, the rotation angle range among the front side shell 301, the rear side shell 302 and the connecting arc frame 303 is 0-360 degree. Through the connection among the heat dissipation metal piece A 304, the heat dissipation metal piece B 305 and the connecting arc frame 303, the 360° rotation between the heat dissipation metal piece B 305 and the connecting arc frame 303 could be realized and the 360° rotation between the clamping disk body 2 and the rotating lamp body 3 could also be realized; the lamp board 306 and the fixed connecting plate 307 could be conveniently installed on the front side shell 301. The bottom support seat 1 comprises the bottom magnetic attraction block 101, the socket shell 102, the anti-skid pattern of shell 103, the clamping rotary block 104 and the flexible support rod 105; one end of the flexible support rod 105 is fixedly connected with the clamping rotary block 104, and the other end of which is fixedly connected with the bottom magnetic attraction block 101. The clamping disk body 2 includes the disk shell 201, the clamping groove 202, the plug-in rotary through hole 203 and the matching block 204, and the top end of the clamping rotary block 104 is clamped with the clamping groove 202. The heat dissipation metal piece A 304 and the heat dissipation metal piece B 305 are located between the joint of the connecting arc frame 303 with the front side shell 301 and the rear side shell 302 respectively, and the front side shell 301 and the rear side shell 302 are oppositely arranged. When in use, the overall heat dissipation effect could be better, and the heat dissipation is achieved through the heat dissipation metal sheet, so that the heat dissipation setting is more ingenious; at the same time, the lamp boards 306 are used when in lighting, which is not easy to burn, and the lamp boards could be replaced more conveniently. Moreover, the integral bottom support base 1 is provided with the magnetic attraction, so that it could be placed easier and used more conveniently. The rotating lamp body 3 includes the front side shell 301, the rear side shell 302, the connecting arc frame 303, the heat dissipation metal piece A 304, the heat dissipation metal piece B 305, the lamp board 306, the fixed connecting plate 307, the inserted rotating block 308, the circuit board controlled by switch 309, the screw hole 310 and the polymer battery 311, and the polymer battery 311 is electrically connected with the circuit board controlled by switch 309 and the lamp board 306 through wires. The sealant is provided within the screw hole 310, the joint between the front side shell 301 and the rear side shell 302, the joint of the heat dissipation metal piece A 304 and the heat dissipation metal piece B 305 with the connecting arc frame 303.

It should be noted that the invention is a portable rotating lamp, including 1. Bottom support seat; 101. Bottom magnetic attraction block; 102. Socket shell; 103. Anti-skid pattern of shell; 104. clamping rotary block; 105. Flexible support rod; 2. Clamping disk body; 201. Disk shell; 202. Clamping groove; 203. Plug-in rotary through hole; 204. Matching block; 3. Rotating lamp body; 301. Front side shell; 302. Rear side shell; 303. Connecting arc frame; 304. Heat dissipation metal piece A; 305. Heat dissipation metal piece B; 306. Lamp board; 307. Fixed connecting plate; 308. Inserted rotating block; 309. Circuit board controlled by switch; 310. Screw holes; 311. Polymer battery. The components are all common standard parts or components known to those skilled in this field, and the structures and principles could be known to those skilled in this field through technical manuals or conventional experimental methods.

The working principle of this invention is as follows: It could overcome the shortcomings that the overall rotation effect of the traditional lamp is relatively poor when in use, in this invention, the whole rotating mode is diversified and could be rotated through two kinds of 360° angles, so that the whole rotating range is wider and could be rotated at multiple angles. When in use, the bottom support seat 1 and the rotating lamp body 3 could be connected by the disk shell 201, the installing and dismounting of the clamping rotary block 104 could be realized through the clamping groove 202, the flexible function could be realized by flexible support rod 105, the magnetic attraction effect could be achieved by the bottom magnetic attraction block 101, and it can be attracted to iron products, the anti-skid patterns of shell 103 could effectively play the role of anti-skid, the plug-in rotary through hole 203 and the Matching block 204 could facilitate the insertion and clamping of the inserted rotating block 308, the polymer battery 311 could supply power to the circuit board controlled by switch 309 and the lamp board 306, the heat dissipation metal piece A 304 and the heat dissipation metal piece B 305 could achieved the heat dissipation function; the connecting arc frame 303 plays the connecting role, through the connection among the heat dissipation metal piece A 304, the heat dissipation metal piece B 305 and the connecting arc frame 303, the 360-degree rotation between the heat dissipation metal piece B 305 and the connecting arc frame 303 could be realized, the 360-degree rotation between the clamping disk body 2 and the rotating lamp body 3 could also be realized; at the same time, the lamp board 306 and the fixed connecting plate 307 could be conveniently installed on the front side shell 301, the fixed connecting plate 307 is also made of metal, through the fixed connection between the fixed connecting plate 307 with the heat dissipation metal piece A 304 and the heat dissipation metal piece B 305, the heat generated by the lamp board 306 passes through the fixed connecting plate 307, and then is transferred to the heat dissipation metal piece A 304 and the heat dissipation metal piece B 305 for heat dissipation operation, so that heat could be dissipated from two sides, and the radiating effect is better, the design of heat dissipation metal sheet for heat dissipation is more ingenious. Moreover, the lamp boards 306 are used when in lighting, which is not easy to burn, and the lamp boards could be replaced more conveniently; finally, the integral bottom support base 1 is provided with the magnetic attraction, so that it can be placed easier and used more conveniently.

While the description above refers to the particular embodiments of the present invention, it will be understood that many modifications may be made without departing from the spirit thereof. Any equivalent replacement or modification would fall within the protection scope of the present invention.

What is claimed is:

1. A portable rotating lamp comprising a bottom support seat (1), a bottom magnetic attraction block (101), a disk shell (201), a front side shell (301), a rear side shell (302) and a connecting arc frame (303), wherein a top end of the bottom support seat (1) is clamped with a clamping disk body (2), and a top surface of the clamping disk body (2) is plugged with a rotating lamp body (3), a top surface of the bottom magnetic attraction block (101) is fixedly connected with a socket shell (102), and a top surface of the socket shell (102) is fixedly connected with a clamping rotary block (104); an outer wall of the socket shell (102) is provided with anti-skid patterns of shell (103), a flexible supporting rod (105) is arranged within the clamping rotary block (104); the outer wall of the bottom surface of the disk shell (201) is provided with a clamping groove (202), the top surface of the disk shell (201) is provided with a plug-in rotary through hole (203) and a matching block (204); the front side shell (301) and the rear side shell (302) are rotatably connected within the connecting arc frame (303), screw holes (310) are positioned on the top surfaces of the front side shell (301) and the rear side shell (302), a polymer battery (311) is placed within the front side shell (301) and the rear side shell (302), the outer walls on both sides of the connecting arc frame (303) are respectively provided with a heat dissipation metal piece A (304) and a heat dissipation metal piece B (305), the top surface of the rear side shell (302) is provided with a circuit board controlled by a switch (309); a fixed lamp plate (307) is fixedly connected inside the front side shell (301), a lamp board (306) is embedded inside the fixed lamp plate (307), the bottom of the connecting arc frame (303) is provided with an inserted rotating block (308), and the bottom of the inserted rotating block (308) is inserted into the plug-in rotary through hole (203), wherein the rotating lamp body (3) is configured to rotate 0-360 degree according to the clamping disk body (2) simultaneously, while the front side shell (301) and the rear side shell (302) rotate 0-360 degree according to the connecting arc frame (303).

2. The portable rotating lamp according to claim 1, wherein the bottom support seat (1) comprises the bottom magnetic attraction block (101), the socket shell (102), the anti-skid pattern of shell (103), the clamping rotary block (104) and the flexible support rod (105), one end of the flexible support rod (105) is fixedly connected with the clamping rotary block (104), and the other end of which is fixedly connected with the bottom magnetic attraction block (101).

3. The portable rotating lamp according to claim 1, wherein the clamping disk body (2) includes the disk shell (201), the clamping groove (202), the plug-in rotary through hole (203) and the matching block (204), and the top end of the clamping rotary block (104) is clamped with the clamping groove (202).

4. The portable rotating lamp according to claim 1, wherein the heat dissipation metal piece A (304) and the heat dissipation metal piece B (305) are located between a joint of the connecting arc frame (303) with the front side shell (301) and the rear side shell (302) respectively, and the front side shell (301) and the rear side shell (302) are oppositely arranged.

5. The portable rotating lamp according to claim 1, wherein the rotating lamp body (3) includes the front side shell (301), the rear side shell (302), the connecting arc frame (303), the heat dissipation metal piece A (304), the heat dissipation metal piece B (305), the lamp board (306), the fixed lamp plate (307), the inserted rotating block (308), the circuit board controlled by the switch (309), the screw hole (310) and the polymer battery (311), and the polymer battery (311) is electrically connected with the circuit board controlled by the switch (309) and the lamp board (306) through wires.

6. The portable rotating lamp according to claim 1, wherein a sealant is provided within the screw holes (310), a joint between the front side shell (301) and the rear side shell (302), the joint of the heat dissipation metal piece A (304) and the heat dissipation metal piece B (305) with the connecting arc frame (303).

* * * * *